US012766407B2

(12) United States Patent
Xu

(10) Patent No.: US 12,766,407 B2
(45) Date of Patent: Oct. 20, 2026

(54) VIRTUAL SCENE GENERATION, SELECTION, AND REPLACEMENT METHOD AND APPARATUS, TERMINAL, AND STORAGE MEDIUM

(71) Applicant: Tencent Technology (Shenzhen) Company Limited, Shenzhen (CN)

(72) Inventor: Zuowei Xu, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 638 days.

(21) Appl. No.: 18/199,229

(22) Filed: May 18, 2023

(65) Prior Publication Data

US 2023/0285855 A1 Sep. 14, 2023

Related U.S. Application Data

(63) Continuation of application No. PCT/CN2022/118485, filed on Sep. 13, 2022.

(30) Foreign Application Priority Data

Oct. 11, 2021 (CN) .......................... 202111184030.9
Dec. 27, 2021 (CN) .......................... 202111619419.1

(51) Int. Cl.
*A63F 13/52* (2014.01)
*A63F 13/533* (2014.01)
(Continued)

(52) U.S. Cl.
CPC ............ *A63F 13/52* (2014.09); *A63F 13/533* (2014.09); *A63F 13/537* (2014.09); *A63F 13/55* (2014.09);
(Continued)

(58) Field of Classification Search
CPC .......... A63F 13/35; A63F 13/48; A63F 13/52; A63F 13/533; A63F 13/537; A63F 13/55;
(Continued)

(56) References Cited

U.S. PATENT DOCUMENTS 8,425,330 B1 * 4/2013 Kislyi .................. A63F 13/795 463/6
9,037,968 B1 * 5/2015 Pringle .................. A63F 13/55 715/273
(Continued)

FOREIGN PATENT DOCUMENTS

CN 105844694 A 8/2016
CN 108510597 A 9/2018
(Continued)

OTHER PUBLICATIONS

Tencent Technology, ISR, PCT/CN2022/118485, Nov. 28, 2022, 3 pgs.
(Continued)

*Primary Examiner* — William H Mcculloch, Jr.
(74) *Attorney, Agent, or Firm* — Morgan, Lewis & Bockius LLP

(57) ABSTRACT

This application provides a virtual scene display method performed by a terminal and a storage medium, relating to the field of computer technologies. The method includes: displaying a plurality of virtual objects for the $i^{th}$ round of battle in a first virtual scene generated by a first account, the plurality of virtual objects being controlled by different accounts participating in battle respectively, i being a positive integer; switching the first virtual scene to a second virtual scene generated by a second account when the $i^{th}$ round of battle ends; and displaying the plurality of virtual objects for the $(i+1)^{th}$ round of battle in the second virtual scene.

20 Claims, 11 Drawing Sheets

(51) Int. Cl.
*A63F 13/537* (2014.01)
*A63F 13/55* (2014.01)
*A63F 13/63* (2014.01)

(52) U.S. Cl.
CPC ........ *A63F 13/63* (2014.09); *A63F 2300/308* (2013.01)

(58) Field of Classification Search
CPC ........ A63F 13/63; A63F 13/79; A63F 13/822; A63F 2300/308
See application file for complete search history.

(56) References Cited

U.S. PATENT DOCUMENTS

| | | | | |
|---|---|---|---|---|
| 9,076,292 | B1 * | 7/2015 | Berger | A63F 13/67 |
| 9,610,504 | B2 * | 4/2017 | Kislyi | A63F 13/837 |
| 10,086,276 | B2 * | 10/2018 | Lowe | A63F 13/30 |
| 10,186,061 | B1 * | 1/2019 | Boxer | A63F 13/60 |
| 10,456,680 | B2 * | 10/2019 | Miron | A63F 13/822 |
| 10,965,994 | B2 * | 3/2021 | Guo | A63F 13/35 |
| 11,839,816 | B2 * | 12/2023 | Xie | A63F 13/497 |
| 12,285,685 | B2 * | 4/2025 | Xie | A63F 13/497 |
| 12,427,417 | B2 * | 9/2025 | Chen | A63F 13/537 |
| 2013/0217489 | A1 * | 8/2013 | Bronstein Bendayan | A63F 13/12 463/31 |
| 2013/0310181 | A1 * | 11/2013 | Kislyi | A63F 13/837 463/42 |
| 2014/0025732 | A1 * | 1/2014 | Lin | A63F 13/795 709/204 |
| 2016/0158648 | A1 * | 6/2016 | Adamson | A63F 13/798 463/31 |
| 2017/0157510 | A1 * | 6/2017 | Lowe | A63F 13/30 |
| 2017/0340971 | A1 * | 11/2017 | Schwaiger | A63F 13/20 |
| 2018/0161675 | A1 * | 6/2018 | Miron | A63F 13/822 |
| 2019/0107990 | A1 | 4/2019 | Spivack et al. | |
| 2019/0208284 | A1 * | 7/2019 | Guo | A63F 13/58 |
| 2020/0114265 | A1 * | 4/2020 | Nam | A63F 13/73 |
| 2023/0075245 | A1 * | 3/2023 | Yang | A63F 13/847 |
| 2023/0285855 | A1 * | 9/2023 | Xu | A63F 13/52 |
| 2024/0375007 | A1 * | 11/2024 | Shi | A63F 13/55 |
| 2025/0025784 | A1 * | 1/2025 | Cai | A63F 13/52 |

FOREIGN PATENT DOCUMENTS

| | | | |
|---|---|---|---|
| CN | 111701235 | A | 9/2020 |
| CN | 112807686 | A | 5/2021 |
| CN | 113813606 | A | 12/2021 |
| CN | 114130020 | A | 3/2022 |

OTHER PUBLICATIONS

Tencent Technology, WO, PCT/CN2022/118485, Nov. 28, 2022, 4 pgs.
Tencent Technology, IPRP, PCT/CN2022/118485, Apr. 16, 2024, 5 pgs.
Tencent Technology, Korean Office Action, KR Patent Application No. 10-2023-7027762, Mar. 5, 2025, 5 pgs.

* cited by examiner

VIRTUAL SCENE GENERATION, SELECTION, AND REPLACEMENT METHOD AND APPARATUS, TERMINAL, AND STORAGE MEDIUM

CROSS-REFERENCE TO RELATED APPLICATIONS

This application is a continuation application of PCT Patent Application No. PCT/CN2022/121317, entitled "IMAGE ACQUISITION MODEL TRAINING METHOD AND APPARATUS, IMAGE DETECTION METHOD AND APPARATUS, AND DEVICE" filed on Sep. 26, 2022, which claims priority to (i) Chinese Patent Application No. 202111184030.9, entitled "VIRTUAL SCENE DISPLAY METHOD AND APPARATUS, TERMINAL, AND STORAGE MEDIUM" filed on Oct. 11, 2021, and (ii) Chinese Patent Application No. 202111619419.1, entitled "VIRTUAL SCENE DISPLAY METHOD AND APPARATUS, TERMINAL, AND STORAGE MEDIUM" filed on Dec. 27, 2021, all of which are incorporated herein by reference in their entirety.

FIELD OF THE TECHNOLOGY

This application relates to the field of computer technologies, in particular to a virtual scene display method and apparatus, a terminal, and a storage medium.

BACKGROUND OF THE DISCLOSURE

With the development of computer technologies, users can experience more and more virtual scenes through game programs, such as cities, towns, deserts, and space. At present, virtual scenes in game programs are mostly produced by game designers.

SUMMARY

Embodiments of this application provide a virtual scene display method and apparatus, a terminal, and a storage medium.

According to one aspect, a virtual scene display method is performed by a terminal. The method includes: displaying a plurality of virtual objects for the $i^{th}$ round of battle in a first virtual scene generated by a first account, the plurality of virtual objects being controlled by different accounts participating in battle respectively, i being a positive integer; switching the first virtual scene to a second virtual scene generated by a second account in response to the end of the $i^{th}$ round of battle; and displaying the plurality of virtual objects for the $(i+1)^{th}$ round of battle in the second virtual scene.

According to another aspect, a terminal is provided. The terminal includes a processor and a memory, the memory storing at least one segment of computer program, and the at least one segment of computer program being loaded and executed by the processor and causing the terminal to implement the virtual scene display method in the embodiments of this application.

According to another aspect, a non-transitory computer-readable storage medium is provided. The computer-readable storage medium stores at least one segment of computer program, and the at least one segment of computer program is loaded and executed by a processor of a terminal and causes the terminal to implement the virtual scene display method in the embodiments of this application.

According to another aspect, a computer program product is provided. The computer program product includes computer program codes, and the computer program codes are stored in a non-transitory computer-readable storage medium. A processor of a terminal reads the computer program codes from the computer-readable storage medium, and the processor executes the computer program codes, so that the computer device performs the foregoing virtual scene display method.

DESCRIPTION OF EMBODIMENTS

To make the objectives, technical solutions, and advantages of this application clearer, the following further describes implementations of this application in detail with reference to the accompanying drawings.

The terms "first", "second", and the like in this application are used for distinguishing identical items or similar items that have essentially identical actions and functions. It is to be understood that there is no logical or temporal dependency relationship among "first", "second" and "nth", and the quantity and execution order are not limited.

In this application, the term "at least one" means one or more, and the term "a plurality of" means two or more.

At present, virtual scenes in game programs are mostly produced by game designers. Due to a long production cycle of a new virtual scene, a user frequently uses the same virtual scene and uses similar battle strategies and operations in the virtual scene, which leads to repetitive and single human-computer interaction mode for the user, resulting in low human-computer interaction efficiency.

The terms involved in this application are explained below.

Virtual scene: The virtual scene is a virtual scene displayed (or provided) when an application runs on a terminal. The virtual scene may be a simulated environment of the real world, a semi-simulated and semi-virtual environment, or a pure virtual environment. The virtual scene may be any of a two-dimensional virtual scene, a 2.5-dimensional virtual scene or a three-dimensional virtual scene. The dimension of the virtual scene is not limited in the embodiments of this application. For example, the virtual scene may include sky, land, sea, and the like, and the land may include desert, cities and other environmental elements. Users may control virtual objects to move in the virtual scene.

Virtual object: The virtual object refers to a movable object in the virtual world. The movable object may be at least one of virtual characters, virtual animals and cartoon characters. In some embodiments, when the virtual world is three-dimensional virtual world, the virtual object is a three-dimensional model. Each virtual object has a shape and a volume in the three-dimensional virtual world, and occupies some space in the three-dimensional virtual world. In some embodiments, the virtual object is a three-dimensional character constructed based on the three-dimensional human skeleton technology. The virtual object achieves different external appearances by wearing different skins. In some embodiments, the virtual object is implemented by a 2.5-dimensional or 2-dimensional model, which is not limited in the embodiments of this application.

Massive (massively) multiplayer online game (MMOG): MMOG generally refers to any network game in which the server can provide a large number of players (about 1000 people) online simultaneously.

The implementation environments involved in this application are introduced below.

Figure 1:
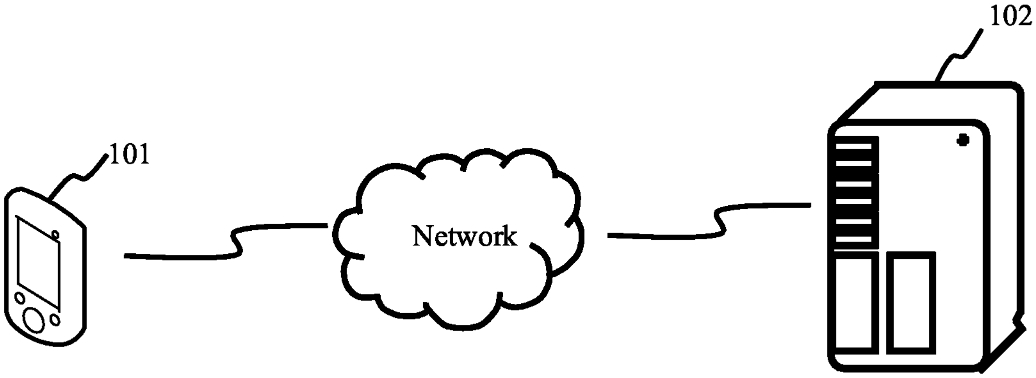
FIG. 1 is a schematic diagram of an implementation environment of a virtual scene display method according to an embodiment of this application.

The virtual scene display method provided in the embodiments of this application may be performed by a terminal. The implementation environments of the virtual scene display method provided in the embodiments of this application are introduced below. FIG. 1 is a schematic diagram of an implementation environment of a virtual scene display method according to an embodiment of this application. Referring to FIG. 1, the implementation environment includes a terminal 101 and a server 102. The terminal 101 and the server 102 are directly or indirectly connected in a wired or wireless communication mode, which is not limited in this application.

In some embodiments, the terminal 101 may be a smart phone, a tablet computer, a notebook computer, a desktop computer, a smart speaker, a smart watch, or the like, but is not limited thereto. The terminal 101 installs and runs an application that supports virtual scenes. The application may be any one of an MMOG, a first-person shooting game (FPS), a third-person shooting game, a multiplayer online battle arena game (MOBA), a virtual reality application, a three-dimensional map program, and a multiplayer device survival game. In some embodiments, more or fewer terminals may be provided. For example, one terminal may be provided, or dozens or hundreds of terminals or more terminals may be provided. The quantity of terminals and the types of devices are not limited in the embodiments of this application.

In some embodiments, the terminal 101 is a terminal used by a user. The user uses the terminal 101 to operate a virtual object in a virtual scene for activities. The activities include but are not limited to: at least one of adjusting body posture, creeping, walking, running, riding, jumping, driving, picking, shooting, interacting and throwing. In some embodiments, the virtual object is a virtual character, such as a simulation character or a cartoon character.

In some embodiments, the server 102 is an independent physical server, or a server cluster or distributed system composed of a plurality of physical servers, or a cloud server that provides basic cloud computing services, such as cloud services, cloud databases, cloud computing, cloud functions, cloud storage, network services, cloud communications, middleware services, domain name services, security services, content delivery networks (CDNs), big data and artificial intelligence platforms. The server 102 is configured to provide background services for applications that support virtual scenes. In some embodiments, the server 102 undertakes the main computational work, and the terminal 101 undertakes the secondary computational work; or, the server 102 undertakes the secondary computational work, and the terminal 101 undertakes the main computational work; or a distributed computing architecture is used between the server 102 and the terminal 101 for collaborative computing.

In some embodiments, the virtual object controlled by the terminal 101 (hereinafter referred to as the controlled virtual object) and the virtual objects controlled by other terminals 101 (hereinafter referred to as other virtual objects) are located in a same virtual scene, and the controlled virtual object can battle with the other virtual objects in the virtual scene. In some embodiments, the controlled virtual object and the other virtual objects have an adversarial relationship. For example, the controlled virtual object and the other virtual objects belong to different teams and organizations, and the virtual objects having an adversarial relationship battle with each other in a mode of releasing skills from each other.

Figure 2:
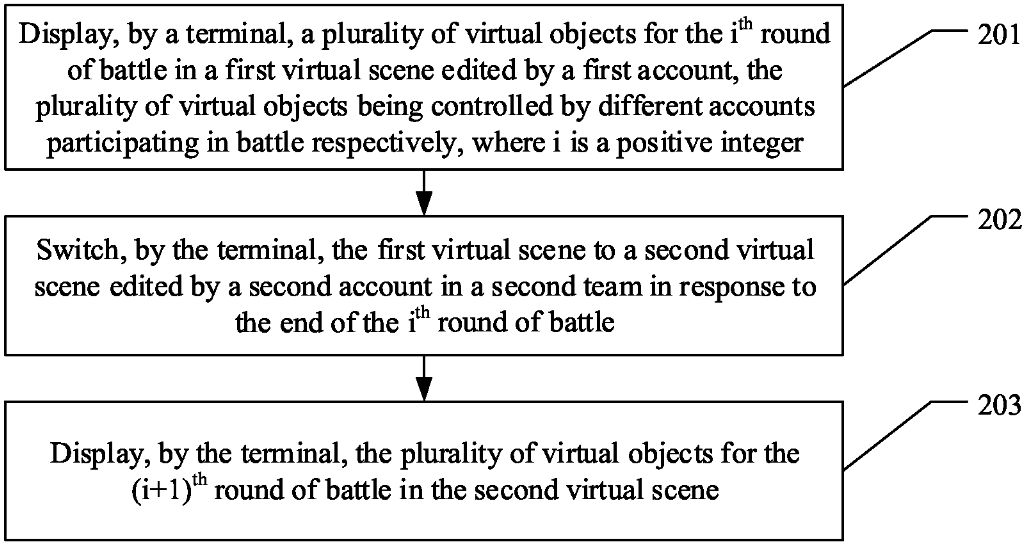
FIG. 2 is a flowchart of a virtual scene display method according to an embodiment of this application.

FIG. 2 is a flowchart of a virtual scene display method according to an embodiment of this application. As shown in FIG. 2, in the embodiments of this application, the execution by a terminal is taken as an example for description. The virtual scene display method includes the following steps:

201: Display, by the terminal, a plurality of virtual objects for the $i^{th}$ round of battle in a first virtual scene generated by a first account, the plurality of virtual objects being controlled by different accounts participating in battle respectively, and i being a positive integer.

In the embodiments of this application, the terminal is the terminal 101 shown in FIG. 1. The first account and the second account are accounts participating in multiple rounds of battle. The multiple rounds of battle refer to two or more rounds of battle. During the $i^{th}$ round of battle between the first account and the second account, the terminal displays a first virtual scene generated by the first account, and a plurality of virtual objects controlled by different accounts are displayed in the first virtual scene for the $i^{th}$ round of battle. The plurality of virtual objects is two or more virtual objects, and one account participating in battle may control one or more virtual objects.

202: Switch, by the terminal, the first virtual scene to a second virtual scene generated by the second account in response to the end of the $i^{th}$ round of battle.

In the embodiments of this application, the virtual scenes used in two adjacent rounds of battle are different. When the $i^{th}$ round of battle ends, the terminal switches the first virtual scene used in the $i^{th}$ round of battle to the second virtual scene generated by the second account, that is, the virtual scenes used in two adjacent rounds of battle are edited by different accounts.

203: Display, by the terminal, the plurality of virtual objects for the $(i+1)^{th}$ round of battle in the second virtual scene.

In the embodiments of this application, after the scene is switched, during the $(i+1)^{th}$ round of battle, the terminal displays the plurality of virtual objects participating in battle for the $(i+1)^{th}$ round of battle in the second virtual scene. The $(i+1)^{th}$ round of battle is any round of battle other than the first round of battle.

According to the technical solutions provided in the embodiments of this application, by alternately displaying the first virtual scene generated by the first account and the second virtual scene generated by the second account during multiple rounds of battle between the virtual object controlled by the first account and the virtual object controlled by the second account, the virtual scenes of the first account and the second account will change during battle. Both parties in battle do not understand the virtual scene generated by the other party, so it is necessary to flexibly use battle strategies and operations for battle, resulting in frequent and non-repetitive human-computer interaction so as to improve the human-computer interaction efficiency.

Figure 3:
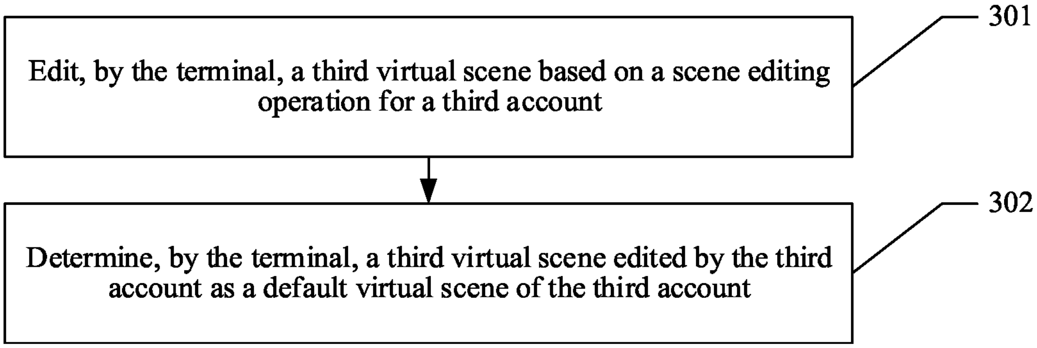
FIG. 3 is a flowchart of another virtual scene display method according to an embodiment of this application.

FIG. 2 exemplarily shows a main process of a virtual scene display method provided in an embodiment of this application by taking a first account and a second account as examples. FIG. 3 is a flowchart of another virtual scene display method according to an embodiment of this application. As shown in FIG. 3, in the embodiments of this application, the execution by a terminal is taken as an example for description. The terminal currently logs in a third account. The third account is the foregoing first account, or the third account is the foregoing second account, or the third account has a teammate relationship with the foregoing first account, or the third account has a teammate relationship with the foregoing second account, or the third account has no association relationship with the foregoing first account and the foregoing second account. The virtual scene display method includes the following steps:

301: Edit, by the terminal, a third virtual scene based on a scene editing operation for the third account.

In the embodiments of this application, the terminal is the terminal 101 shown in FIG. 1, the third account is the account currently logged in by the terminal, and the third account is used for controlling virtual objects for battle in virtual scenes. The third virtual scene is edited by the third account based on the initial virtual scene and at least one scene element. Scene elements include trees, stones, lakes, masonries, and the like.

In some embodiments, a mode of editing the third virtual scene by the third account includes: the terminal displays an initial virtual scene and a scene element column in response to a scene editing operation, and the scene element column displays a plurality of scene elements to be added. Then, the terminal displays the scene element in the initial virtual scene in response to an operation for adding any scene element, and the third account may add one or more scene elements to the initial virtual scene. Finally, the terminal transmits a scene generation request to a server in response to a scene generation operation, the scene generation request is used for instructing the server to generate a third virtual scene, and the third virtual scene includes the initial virtual scene and at least one scene element added to the initial virtual scene. By providing a virtual scene editing function, users may freely edit virtual scenes according to their needs and preferences so as to obtain different virtual scenes.

In some embodiments, the initial virtual scene displays a controlled virtual object, and the controlled virtual object is controlled by the third account currently logged in by the terminal. The step of displaying, by the terminal, the scene element in the initial virtual scene in response to an operation for adding any scene element includes: the terminal displays the controlled virtual object moving to a target position indicated by the adding operation in response to an operation for adding any scene element, and then, the terminal displays the controlled virtual object placing the scene element at the target position. In some embodiments, the terminal displays at least one control in response to an editing end operation, and the at least one control is configured to control the controlled virtual object. The terminal displays the controlled virtual object moving in the third virtual scene in response to a control operation for the controlled virtual object. By displaying the scene elements added by the controlled virtual object in the initial virtual scene and then controlling the controlled virtual object to move in the third virtual scene after editing, the third virtual scene may be observed and experienced from the view of the controlled virtual object, so as to facilitate the verification and modification of the third virtual scene.

Figure 4:
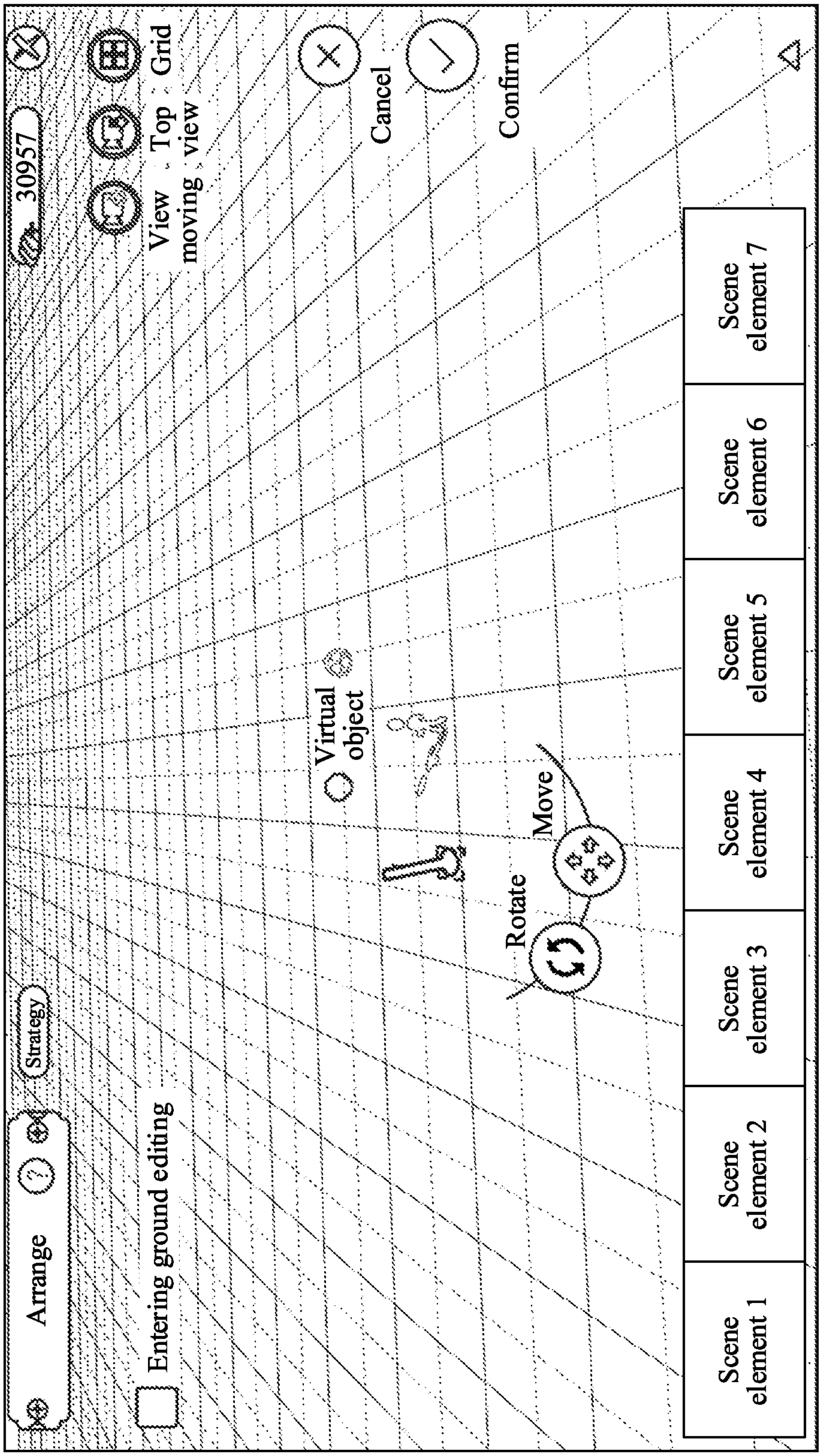
FIG. 4 is a schematic diagram of editing a virtual scene according to an embodiment of this application.

For example, FIG. 4 is a schematic diagram of editing a virtual scene according to an embodiment of this application. Referring to FIG. 4, FIG. 4 exemplarily shows an initial virtual scene and a scene element column. The initial virtual scene displays a controlled virtual object, and the scene element column exemplarily shows 7 scene elements. The terminal determines that an operation for adding the clicked scene element is detected in response to click and drag operations for any scene element. After detecting the end of the drag operation, the terminal controls the controlled virtual object to move to a scene position where the drag operation ends, and the foregoing clicked scene element, such as the tree shown in FIG. 4, is placed at the scene position. After the scene element is placed in the initial virtual scene, the terminal displays a rotation control and a movement control. The rotation control is configured to rotate the orientation of the scene element, and the movement control is configured to move the position of the scene element. Of course, the terminal may also directly place the scene element in the initial virtual scene according to an operation for adding any scene element without displaying the placement by the controlled virtual object, which is not limited in the embodiments of this application. FIG. 4 also exemplarily shows an option of "entering ground editing". In response to a check operation of the option of "entering ground editing", the terminal displays multiple ground types of scene elements in the scene element column, such as sand, grass, bricks and water. FIG. 4 further exemplarily shows a view moving control, a top view control and a grid control, where the view moving control is configured to move the current viewing angle, the top view control is configured to switch the current viewing angle to the top view, and the grid control is configured to display and hide the grids shown in FIG. 4. FIG. 4 further exemplarily shows a confirm control and a cancel control, where the confirm control is configured to save the editing operation, and the cancel control is configured to abandon the editing operation. In response to a trigger operation for the confirm control, the terminal confirms that an editing end operation is detected, and the terminal displays at least one control, so that a user may control the controlled virtual object to move in the edited third virtual scene based on the at least one control. FIG. 4 further exemplarily shows a strategy control. The strategy control is configured to provide guidance information for editing virtual scenes to guide the user in adding scene elements, so as to edit desired virtual scenes.

Scene elements are also configured with adding rules, for example, trees cannot be added to the water, and added scene elements cannot form enclosed and inaccessible areas. When detecting an operation for adding any scene element, the terminal determines whether the adding operation conforms to the adding rules of the scene element. When the adding operation conforms to the adding rules of the scene element, the terminal adds the scene element in the initial virtual scene. When the adding operation does not conform to the adding rules of the scene element, the terminal does not add the scene element in the initial scene.

In some embodiments, the third account can name the third virtual scene. The step of transmitting, by the terminal, a scene generation request to a server in response to a scene generation operation includes: the terminal displays a scene naming interface in response to the scene generation operation, and the scene naming interface is configured to set a scene name of the third virtual scene. The terminal transmits a name verification request to the server, and the name verification request is used for instructing the server to verify the scene name inputted based on the scene naming interface. The terminal transmits the scene generation request to the server when the server verification passes. By providing the scene naming interface and supporting the third account to name edited virtual scenes, in order to avoid the case that an inputted scene name contains sensitive vocabularies, the server verifies the scene name and then transmits a scene generation request after the verification passes to generate a third virtual scene. By verifying the scene name first and then transmitting the scene generation request, it is possible to avoid frequent transmitting of scene data that generates a third virtual scene due to the fact that the scene name does not meet the requirements, thereby saving the communication overhead between the terminal and the server.

Figure 5:
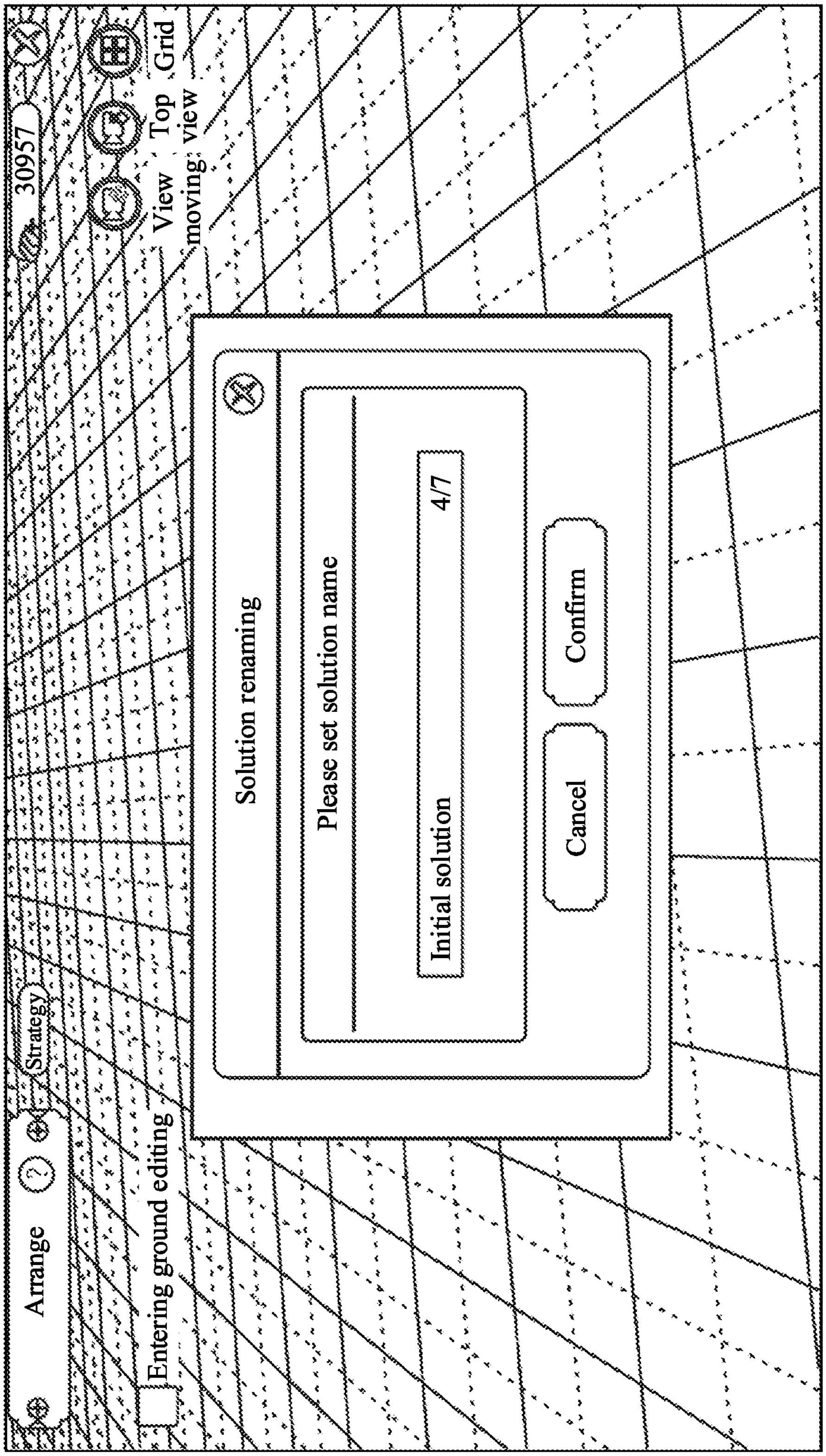
FIG. 5 is a schematic diagram of a scene naming interface according to an embodiment of this application.

For example, FIG. 5 is a schematic diagram of a scene naming interface according to an embodiment of this application. Referring to FIG. 5, the scene naming interface displays a name input box, and the name input box is configured to input a scene name. The name input box displays "initial solution" by default as a default scene name. In response to a trigger operation for the confirm control displayed on the scene naming interface, the terminal transmits a name verification request to the server, and the name verification request carries the scene name inputted in the foregoing name input box. FIG. name input box has a name length limit. As shown in FIG. 5, the name length limit is 7, that is, the input of a scene name that exceeds 7 characters is not supported. Further, the server can verify whether the scene name submitted by the terminal contains sensitive vocabularies. If the scene name contains sensitive vocabularies, the server returns verification failure, and when the server verification fails, the terminal prompts for sensitive vocabularies and clears the name input box. If the scene name does not contain sensitive vocabularies and the server returns verification failure, the terminal prompts the reason for the failure and does not clear the name input box. If the scene name does not contain sensitive vocabularies and the server returns verification pass, the terminal transmits a scene generation request.

In some other embodiments, the terminal directly transmits a scene generation request, the scene generation request carries the scene name inputted based on the scene naming interface, and the server verifies the scene name first and generates a third virtual scene after the verification passes. By directly transmitting the scene generation request, the number of data interactions can be reduced, and the data interaction efficiency can be improved. FIG. name verification may also be performed by the terminal, and is not limited in the embodiments of this application.

In some embodiments, each account can save one or more virtual scenes in the server, but the quantity of virtual scenes saved by each account cannot exceed the target quantity. After the terminal transmits a scene generation request to the server, if the quantity of virtual scenes saved by the third account reaches the target quantity, this will result in the quantity of the saved virtual scenes and the third virtual scene generated this time exceeding the target quantity. At this time, the terminal displays the first prompt information returned by the server, and the first prompt information is used for prompting that the quantity of virtual scenes saved by the third account currently logged in by the terminal exceeds the target quantity. The terminal displays a scene display interface in response to a confirmation operation for the first prompt information, and the scene display interface is configured to display the virtual scenes saved by the third account. The terminal replaces the selected virtual scene with the third virtual scene based on a selection operation in the scene display interface. The target quantity is a positive integer greater than 1, such as 3, 4 or 5, which is not limited in the embodiments of this application. By setting the target quantity, it is possible to avoid each account from endlessly saving virtual scenes, which not only meets the needs of setting multiple virtual scenes for the account, but also enables the account to conveniently and quickly select the desired virtual scene.

Figure 6:
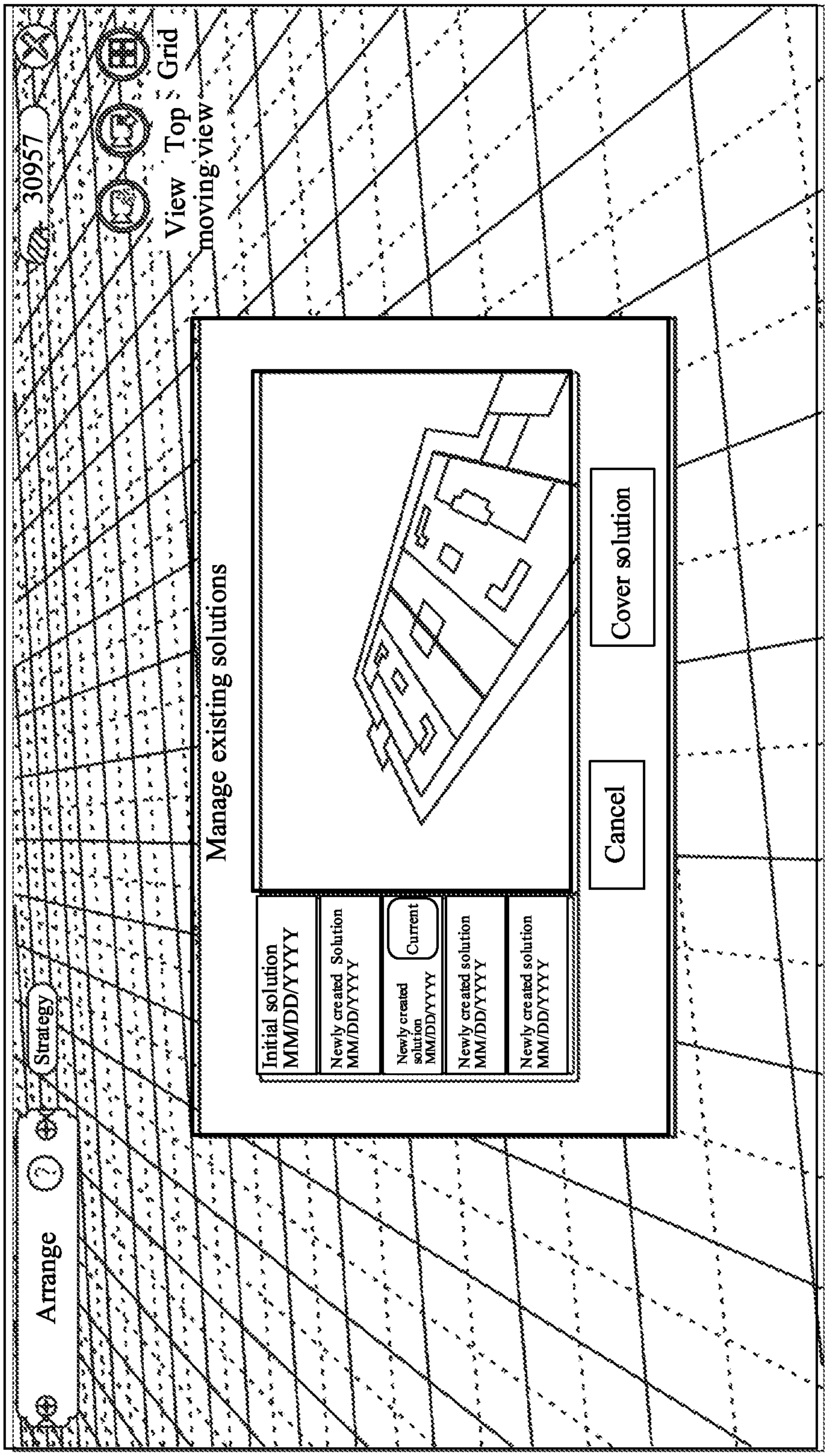
FIG. 6 is a schematic diagram of a scene display interface according to an embodiment of this application.

For example, when the target quantity is 5, after the terminal transmits a scene generation request to the server, if the quantity of the virtual scenes saved by the third account reaches 5, new virtual scenes cannot be saved, the server returns the first prompt information, and the first prompt information prompts that there are 5 saved virtual scenes. The terminal displays the first prompt information and displays a confirm control and a cancel control of the first prompt information, and the terminal instructs the server to cancel the generation of the third virtual scene in response to a trigger operation for the cancel control. The terminal determines that a confirmation operation for the first prompt information is detected in response to a trigger operation for the confirm control, and the terminal displays the scene display interface. FIG. 6 is a schematic diagram of a scene display interface according to an embodiment of this application. Referring to FIG. 6, FIG. 6 exemplarily shows 5 saved virtual scenes and the saving time of each virtual scene. The default virtual scene is identified by "current". The scene display interface displays a cancel control and a cover solution control, and the terminal instructs the server to cancel the generation of the third virtual scene in response to a trigger operation for the cancel control. In response to a selection operation for any virtual scene and a trigger operation for the cover solution control, the terminal instructs the server to replace the selected virtual scene with the third virtual scene.

302: Determine, by the terminal, the third virtual scene generated by the third account as the default virtual scene of the third account.

In the embodiments of this application, the terminal determines the third virtual scene finally edited by the third account as the default virtual scene of the third account, or the terminal determines the default virtual scene set by the third account based on a setting operation of the third account in the scene display interface.

In some embodiments, when the third account does not save any virtual scene, the terminal determines the third virtual scene as the default virtual scene of the third account.

In some embodiments, when the third account saves at least one virtual scene, after the terminal transmits a scene generation request to the server, the terminal displays the second prompt information returned by the server, and the second prompt information is used for prompting that the third virtual scene is not the default virtual scene of the third account. Then, the terminal displays the scene display interface, and sets the virtual scene as the default virtual scene of the third account in response to a setting operation for any virtual scene in the scene display interface.

In some embodiments, when the third account saves at least one virtual scene, after the terminal transmits a scene generation request to the server, the terminal displays the second prompt information returned by the server and displays a cancel control and a setting control of the second prompt information, and the display of the second prompt information is removed in response to a trigger operation for the cancel control. In response to a trigger operation for the setting control, the third virtual scene is set as the default virtual scene of the third account.

By providing an editing function of virtual scenes and a setting function of a default virtual scene, multiple personalized virtual scenes can be edited based on the initial virtual scene, and any edited virtual scene is set as the default virtual scene, so that the default virtual scene is used for battle. Due to the fact that the other party is not familiar with the default virtual scene obtained by personalized editing at the terminal during battle, it is able to take advantages in the default virtual scene during battle, so as to improve the human-computer interaction efficiency.

Figure 7:
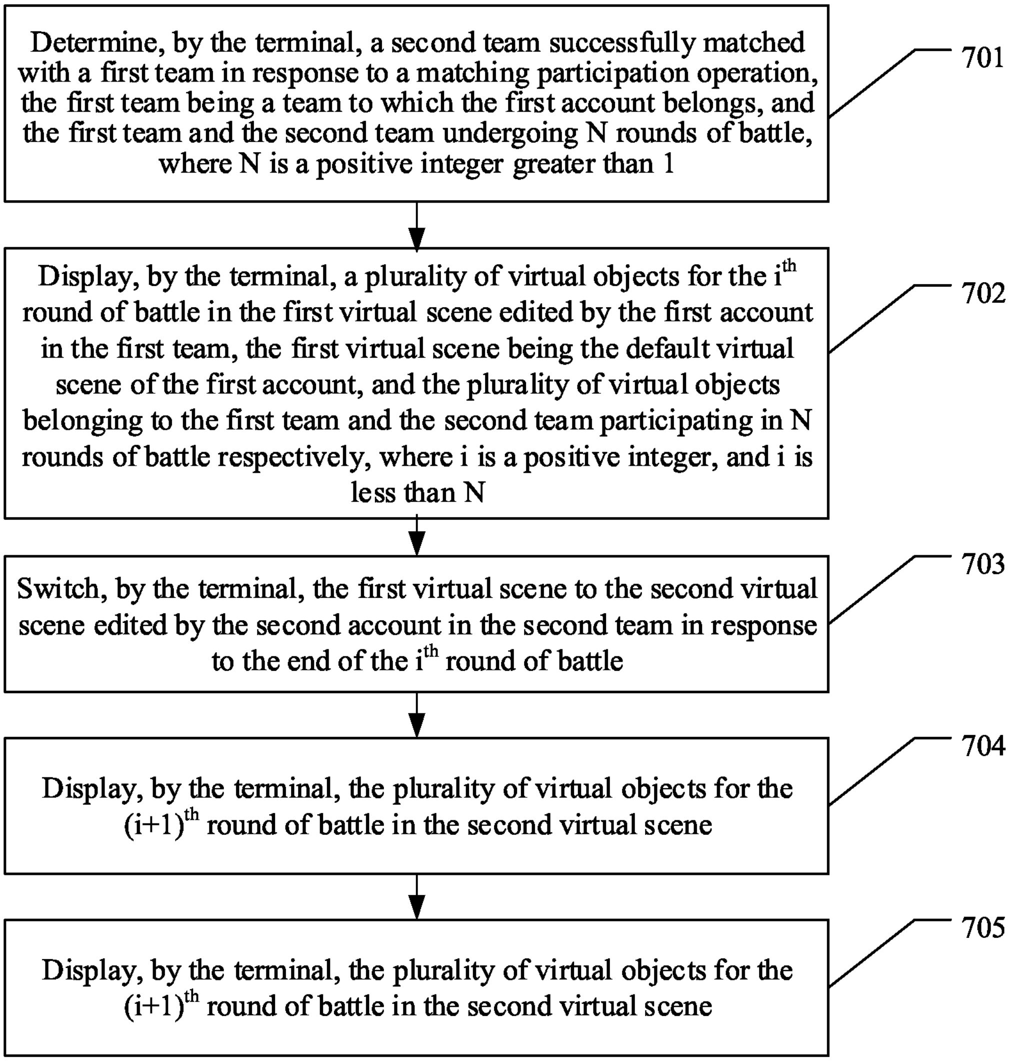
FIG. 7 is a flowchart of another virtual scene display method according to an embodiment of this application.

FIG. 2 exemplarily shows a main process of a virtual scene display method provided in an embodiment of this application by taking a first account and a second account as examples. The first account and the second account participate in matching respectively, and the battle is carried out after successful matching. If the first account participates in 1V1 matching, the account successfully matched with the first account is the second account, and the first account and the second account will undergo N rounds of battle, where N is a positive integer greater than 1, and i is less than N. If the first account participates in team matching, the team successfully matched with the first team to which the first account belongs is the second team, and the first team and the second team will undergo N rounds of battle. The difference between 1V1 matching and team matching is that a team includes at least one account, that is, when each team includes one account, 1V1 matching is equivalent to team matching. The team matching is taken as an example for description below. FIG. 7 is a flowchart of another virtual scene display method according to an embodiment of this application. As shown in FIG. 7, the execution by a terminal with a first account currently logged in is taken as an example for description. The virtual scene display method includes the following steps:

701: Determine, by the terminal, a second team successfully matched with a first team in response to a matching participation operation, the first team being a team to which the first account belongs, and the first team and the second team undergoing N rounds of battle, where N is a positive integer greater than 1.

In the embodiments of this application, the terminal displays a matching interface, and the first account participates in matching in the matching interface.

Figure 8:
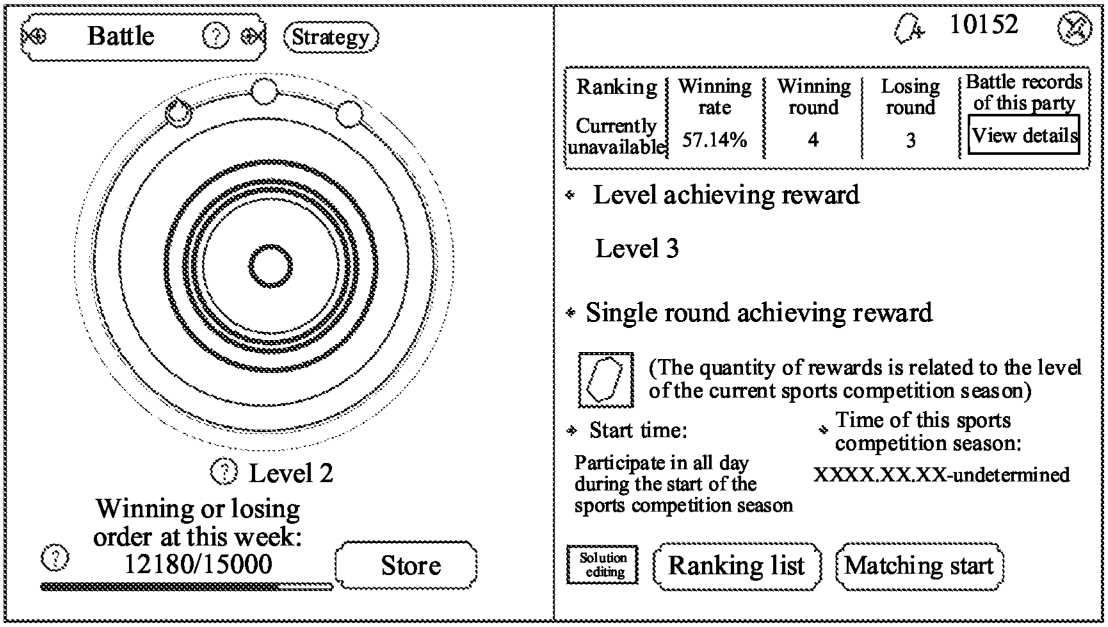
FIG. 8 is a schematic diagram of a matching interface according to an embodiment of this application.

For example, FIG. 8 is a schematic diagram of a matching interface according to an embodiment of this application. Referring to FIG. 8, FIG. 8 exemplarily shows a matching interface for battle. The matching interface displays a matching start control, and it is determined that a matching participation operation is detected in response to a trigger operation for the matching start control. FIG. 8 further exemplarily shows a solution editing control. The solution editing control is configured to edit a new virtual scene or edit a saved virtual scene after being triggered, which is not limited in this application. FIG. 8 further exemplarily shows the current level, ranking, winning rate, winning round, losing round and other information of the first account, which will not be listed one by one here.

In some embodiments, when a default virtual scene is not set for the first account, the first account cannot participate in matching. Correspondingly, in response to a matching participation operation, the terminal determines the default virtual scene saved by the first account. When the first account does not save the default virtual scene, the terminal displays the third prompt information, and the third prompt information is used for prompting that the default virtual scene which is not saved cannot participate in matching. In some embodiments, the terminal further displays a cancel control and a confirm control of the third prompt information. In response to a trigger operation for the cancel control, matching participation is canceled. In response to a trigger operation for the confirm control, a scene display interface is displayed to set a default virtual scene. By verifying whether an account sets a default virtual scene during matching, it is possible to avoid both parties from having no virtual scene available for battle after the start of the battle. In some embodiments, the account without a default virtual scene can also participate in matching. The server allocates a random virtual scene to one of the both parties in battle without a default virtual scene, which is not limited in the embodiments of this application.

FIG. embodiment of this application takes the account currently logged in by the terminal as a first account as an example for description. In some embodiments, the account currently logged in by the terminal is the foregoing second account, or the account currently logged in by the terminal is the third account in the embodiment shown in FIG. 3. The following explains how to determine a first account and a second account from the perspective of the server.

In some embodiments, according to the order in which the two successfully matched teams participate in matching, the server determines the team in the first order as the first team, and the first account is any account in the first team. Correspondingly, the second team is another team successfully matched with the first team, and the second account is any account in the second team. The server transmits the first virtual scene generated by the first account to the terminal, and the terminal displays the first virtual scene. In the first virtual scene, a plurality of virtual objects is displayed for the $i^{th}$ round of battle. The plurality of virtual objects is two or more virtual objects controlled by different accounts. The server transmits the second virtual scene generated by the second account to the terminal, and the terminal displays the second virtual scene. In the second virtual scene, the plurality of virtual objects is displayed for the $(i+1)^{th}$ round of battle.

In some embodiments, the server determines the account with a team leader identifier in the first team as the first account, that is, in the embodiments of this application, the first account has a team leader identifier. In a similar way, the server determines the account with a team leader identifier in the second team as the second account.

In some embodiments, according to the order in which the accounts from two successfully matched teams participate in matching, the server determines the account in the first order as the first account, that is, in the embodiments of this application, the order in which the first account participates in matching is ranked first among all accounts in the two teams. The server determines the team to which the first account belongs as the first team, and determines another team as the second team. The server determines the account in the first order that participates in matching in the second team as the second account.

702: Display, by the terminal, a plurality of virtual objects for the $i^{th}$ round of battle in the first virtual scene generated by the first account in the first team, the first virtual scene being the default virtual scene of the first account, and the plurality of virtual objects belonging to the first team and the second team participating in N rounds of battle respectively, where i is a positive integer, and i is less than N.

In the embodiments of this application, the first virtual scene is edited by the first account based on an initial virtual scene and a plurality of scene elements. The editing process is shown in step 301 and will not be repeated here. For example, the first virtual scene is a virtual scene finally edited by the first account or a default virtual scene set by the first account in the scene display interface. Each of the first team and the second team includes two or more virtual objects, and the virtual objects correspond to accounts one by one, that is, one account controls one virtual object. The terminal displays a plurality of virtual objects in different teams for the $i^{th}$ round of battle in the first virtual scene.

Figure 9:
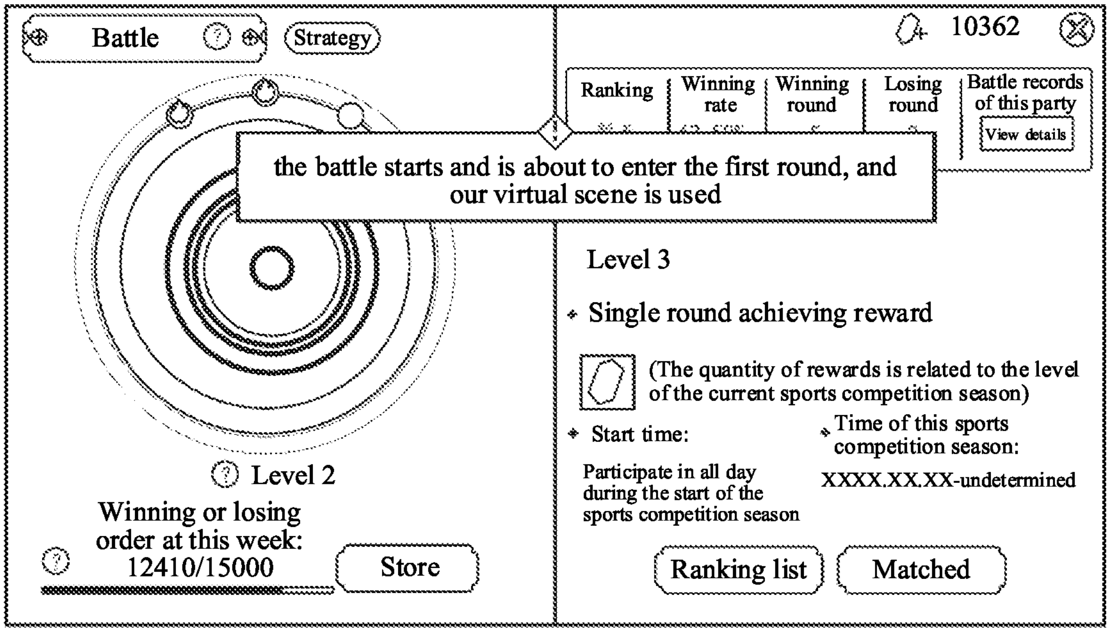
FIG. 9 is a schematic diagram of another matching interface according to an embodiment of this application.

For example, taking N=3 as an example, the first team and the second team undergo 3 rounds of battle, and the team that wins the two rounds first is the winning team. When i=1, the $i^{th}$ round is the first round. FIG. 9 is a schematic diagram of another matching interface according to an embodiment of this application. Referring to FIG. 9, the terminal displays prompt information "the battle starts and is about to enter the first round, and our virtual scene is used" in the matching interface, so as to prompt that the first round of battle uses the first virtual scene generated by the first account. The terminal displays the first virtual scene, the plurality of virtual objects are respectively displayed at both ends of the first virtual scene according to teams, and the terminal displays a plurality of virtual objects for the first round of battle in the first virtual scene. Optionally, the matching start control displayed in the matching interface is updated to "matched", and the solution editing control is removed to ensure that the virtual scene cannot be edited after successful matching.

703: Switch, by the terminal, the first virtual scene to the second virtual scene generated by the second account in the second team in response to the end of the $i^{th}$ round of battle.

In the embodiments of this application, when the $i^{th}$ round of battle ends, the terminal switches the display of the first virtual scene to the display of the second virtual scene for the $(i+1)^{th}$ round of battle, so as to ensure that two adjacent rounds of battle use different virtual scenes.

Figure 10:
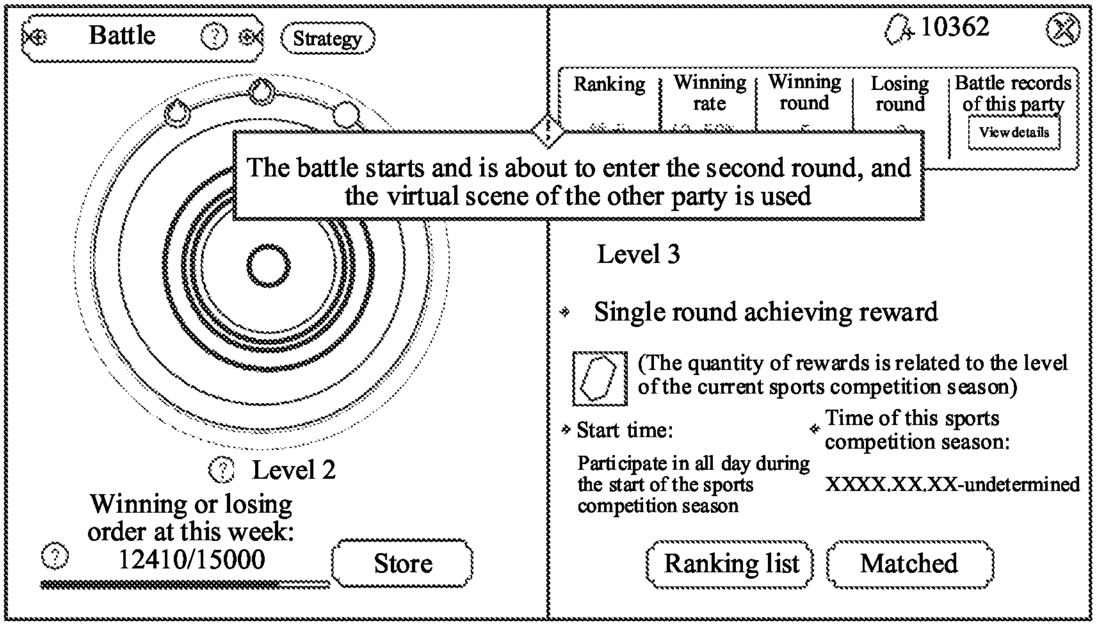
FIG. 10 is a schematic diagram of another matching interface according to an embodiment of this application.

For example, further taking N=3 as an example, the first team and the second team undergo 3 rounds of battle, and the team that wins the two rounds first is the winning team. When i=1, i+1=2, that is, the i+1 round is the second round. FIG. 10 is a schematic diagram of another matching interface according to an embodiment of this application. Referring to FIG. 10, the terminal displays prompt information "the battle starts and is about to enter the second round, and the virtual scene of the other party is used" in the matching interface, so as to prompt that the second round of battle uses the second virtual scene generated by the second account. The terminal displays the second virtual scene, and a plurality of virtual objects is displayed in the second virtual scene for the second round of battle. Optionally, the matching start control displayed in the matching interface is updated to "matched", and the solution editing control is removed to ensure that the virtual scene cannot be edited after successful matching.

704: Display, by the terminal, the plurality of virtual objects for the $(i+1)^{th}$ round of battle in the second virtual scene.

In the embodiments of this application, the terminal displays two or more virtual objects in the first team and the second team for the $(i+1)^{th}$ round of battle in the second virtual scene. The $i^{th}$ round and the $(i+1)^{th}$ round are any two adjacent rounds other than the Nth round of battle in N rounds of battle. If the $(i+1)^{th}$ round is the $(N-1)^{th}$ round and the outcome of the battle between the two teams is determined, the process ends. If the two teams are tied, the Nth round of battle is carried out, and step 705 is performed.

Figure 11:
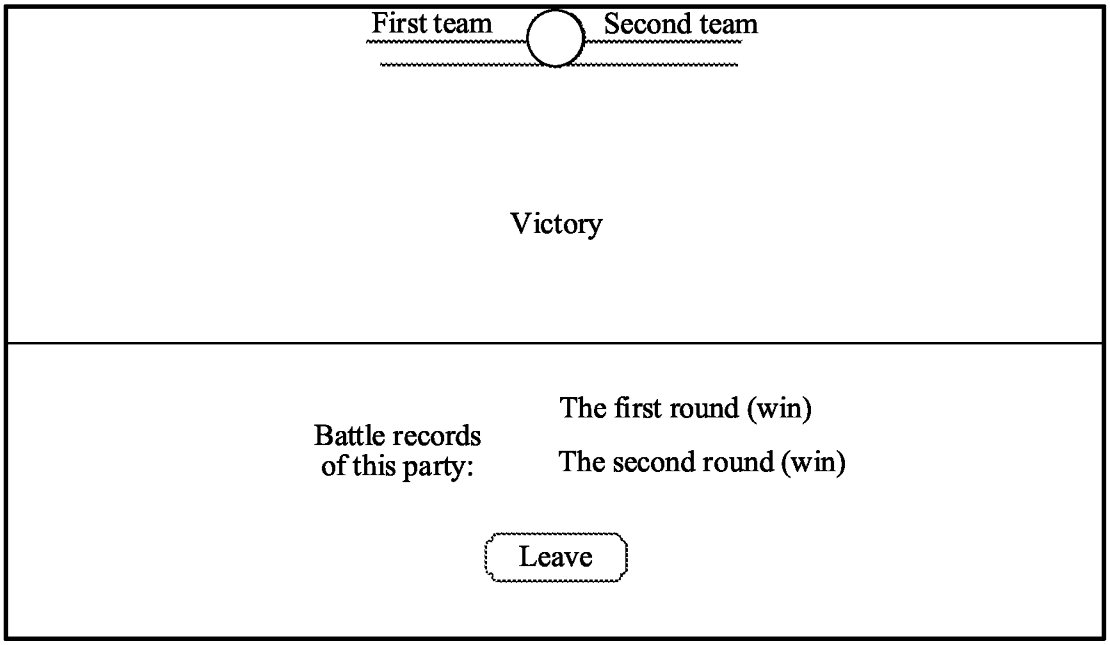
FIG. 11 is a victory information interface according to an embodiment of this application.

For example, further taking N=3 as an example, the first team and the second team undergo 3 rounds of battle, and the team that wins the two rounds first is the winning team. If any team wins both the first round and the second round, the third round of battle is not carried out, and a victory information interface is displayed directly. FIG. 11 is a victory information interface according to an embodiment of this application. Referring to FIG. 11, taking the first team winning the first two rounds as an example, the victory information interface displays battle records of this party. Due to the battle records of the first team winning the first round and the second round, the first team wins this battle under the system of two out of three sets. In some embodiments, if the battle records of this party are one win and one loss, the third round of battle, that is, the Nth round of battle needs to be carried out. For another example, when N=5, the first team and the second team need to undergo 5 rounds of battle, and the team that wins the three rounds first is the winning team. If the teams are tied after the second round of battle and the third round of battle, the fourth round of battle needs to be carried out. If the teams are still tied after the fourth round of battle, the fifth round of battle needs to be carried out.

705: Display, by the terminal, the plurality of virtual objects for the Nth round of battle in another virtual scene in response to the end of the $(N-1)^{th}$ round of battle when the first team and the second team are tied.

In the embodiments of this application, during the Nth round of battle, the terminal uses the first virtual scene or the second virtual scene, or uses virtual scenes other than the first virtual scene and the second virtual scene, such as a fourth virtual scene generated by a fourth account in the first team or the second team, or a fifth virtual scene generated by a fifth account other than the first team or the second team.

In some embodiments, the server can randomly determine a virtual scene from the first virtual scene or the second virtual scene as the virtual scene used in the Nth round of battle. When the $(N-1)^{th}$ round of battle ends and the first team and the second team are tied, the terminal displays a plurality of virtual objects for the Nth round of battle in the first virtual scene or the second virtual scene, where the virtual scene used in the Nth round of battle is the same as or different from that in the $(N-1)^{th}$ round of battle.

Figure 12:
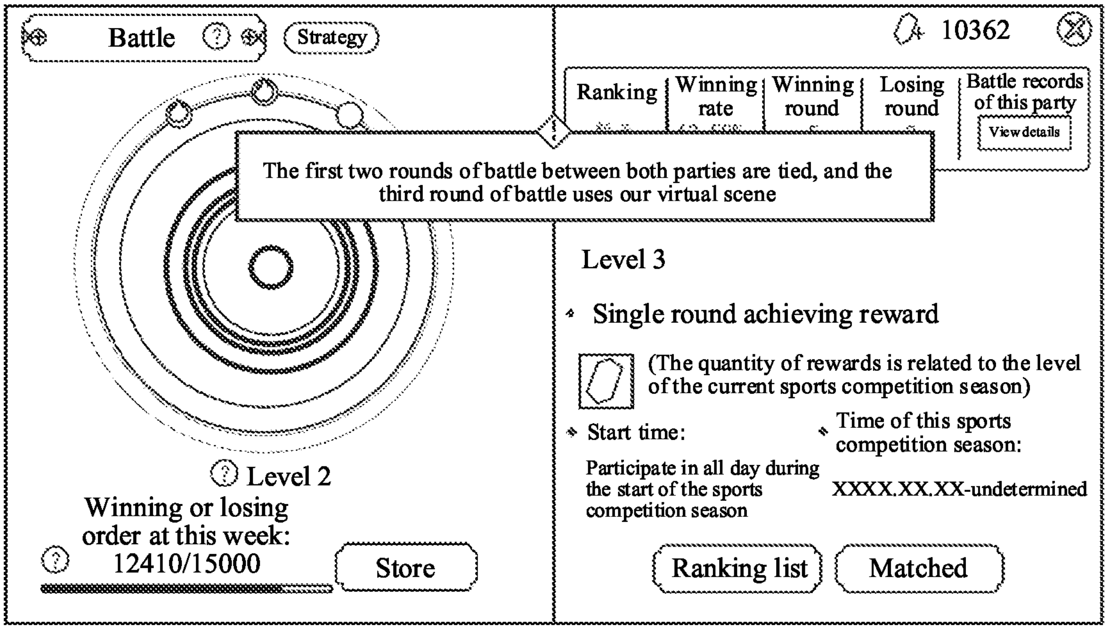
FIG. 12 is a schematic diagram of another matching interface according to an embodiment of this application.

For example, FIG. 12 is a schematic diagram of another matching interface according to an embodiment of this application. Referring to FIG. 12, the terminal displays prompt information "the first two rounds of battle between both parties are tied, and the third round of battle uses our virtual scene" so as to prompt that the first round of battle and the second round of battle between both parties are tied, and the third round of battle uses the first virtual scene generated by the first account in the first team.

In some embodiments, the server determines a fourth account from the first team or the second team, and the terminal obtains a fourth virtual scene generated by the fourth account from the server. The fourth account belongs to the same team as the first account or the second account. The terminal displays a plurality of virtual objects for the Nth round of battle in the fourth virtual scene. By determining the fourth account from the first team or the second team, the virtual scene generated by each account in the two teams participating in battle may be applied to the battle, thereby improving the resource utilization rate of the virtual scenes edited by member accounts in the teams. FIG. case requires each account in the two teams to have a default virtual scene before participating in matching, otherwise the two teams cannot participate in matching.

In some embodiments, the server obtains a fifth account from accounts other than the first team and the second team. The fifth account does not belong to the first team and the second team, that is, the fifth account does not participate in this matching. A fifth virtual scene generated by the fifth account is randomly determined by the server. The terminal obtains the fifth virtual scene generated by the fifth account from the server, and a plurality of virtual objects is displayed in the fifth virtual scene for the Nth round of battle. Since the first account participates in 1V1 matching, or when the first team only has the first account and the second team only has the second account, the server cannot obtain the foregoing fourth account. By obtaining the fifth account from accounts other than the first team and the second team, the virtual scene used in the Nth round of battle has higher randomness, thereby improving the human-computer interaction efficiency.

FIG. N rounds of battle, the outcome of the battle between the first team and the second team is determined, that is, the first team or the second team wins this battle.

Figure 13:
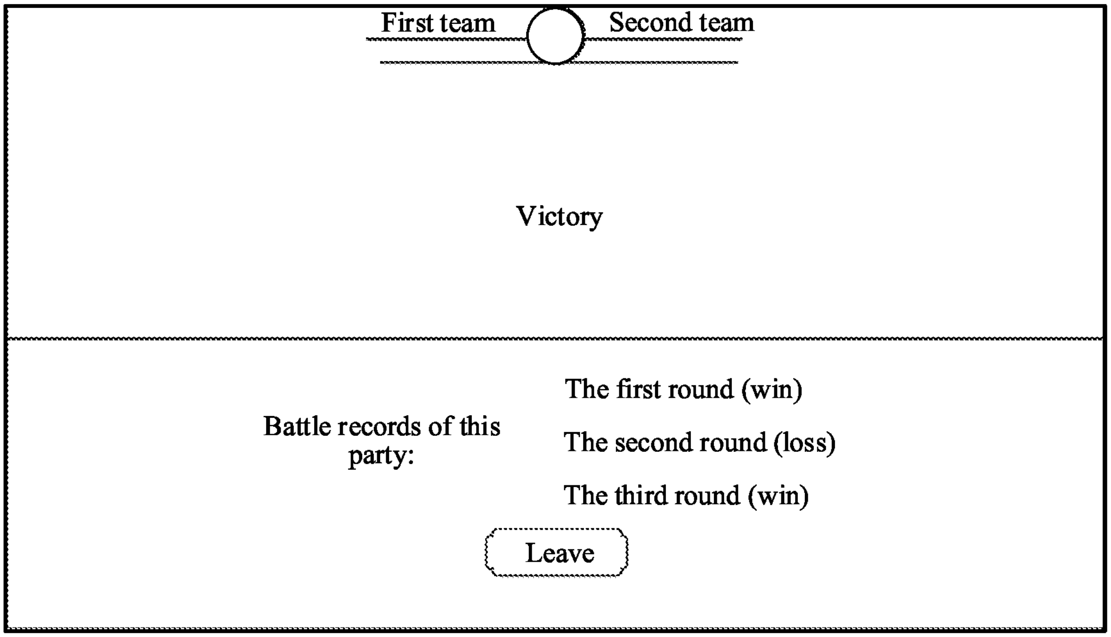
FIG. 13 is another victory information interface according to an embodiment of this application.

For example, further taking N=3 as an example, the first team and the second team undergo 3 rounds of battle, and the team that wins the two rounds first is the winning team. Referring to FIG. 13, FIG. 13 is another victory information interface according to an embodiment of this application. The victory information interface displays battle records of this party, that is, the battle records of the first team are win in the first round, loss in the second round and win in the third round, and the first team wins two rounds in three rounds, thereby winning this battle.

Figure 14:
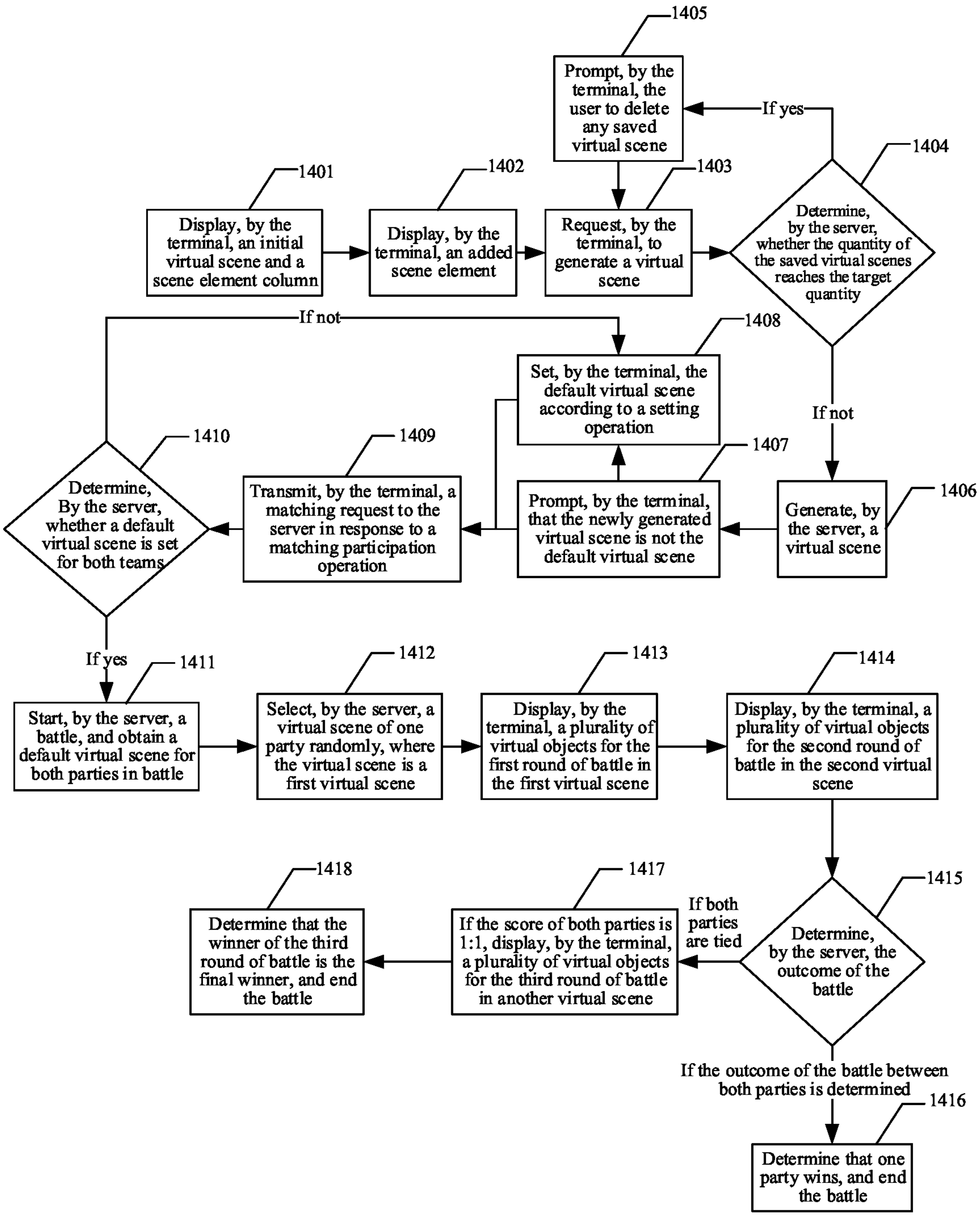
FIG. 14 is a flowchart of another virtual scene display method according to an embodiment of this application.

FIG. 701 to step 705 illustrate the virtual scene display method provided in the embodiments of this application by taking the account currently logged in by the terminal as the first account as an example. In order to make the virtual scene display method easier to understand, referring to FIG. 14, FIG. 14 is a flowchart of another virtual scene display method according to an embodiment of this application. Taking the system of two out of three sets as an example, FIG. 14 includes the following steps: 1401: Display, by the terminal, an initial virtual scene and a scene element column. 1402: Display, by the terminal, an added scene element. 1403: Request, by the terminal, to generate a virtual scene. 1404: Determine, by the server, whether the quantity of the saved virtual scenes reaches the target quantity, where if the quantity reaches the target quantity, perform step 1405; and if the quantity does not reach the target quantity, perform step 1406. 1405: Prompt, by the terminal, the user to delete any saved virtual scene. 1406: Generate, by the server, a virtual scene. 1407: Prompt, by the terminal, that the newly generated virtual scene is not the default virtual scene. 1408: Set, by the terminal, the default virtual scene according to a setting operation. 1409: Transmit, by the terminal, a matching request to the server in response to a matching participation operation. 1410: Determine, by the server, whether a default virtual scene is set for both teams, where if yes, perform step 1411, and if not, return to step 1408. 1411: Start, by the server, a battle, and obtain a default virtual scene for both parties in battle, where both parties in battle refer to two teams which are successfully matched. 1412: Select, by the server, a virtual scene of one party randomly, where the virtual scene is the first virtual scene, and a virtual scene of the other party is the second virtual scene. 1413: Display, by the terminal, a plurality of virtual objects for the first round of battle in the first virtual scene. 1414: Display, by the terminal, a plurality of virtual objects for the second round of battle in the second virtual scene. 1415: Determine, by the server, whether one party wins, where if yes, perform step 1416, and if not, perform step 1417. 1416: If one party wins, end the battle. 1417: If the score of both parties is 1:1, display, by the terminal, a plurality of virtual objects for the third round of battle in another virtual scene. 1418: Determine that the party winning the third round of battle is the final winning party, and end the battle.

According to the technical solutions provided in the embodiments of this application, by alternately displaying the first virtual scene generated by the first account and the second virtual scene generated by the second account during multiple rounds of battle between the virtual object controlled by the first account and the virtual object controlled by the second account, the virtual scenes of the first account and the second account will change during battle. Both parties in battle do not understand the virtual scene generated by the other party, so it is necessary to flexibly use battle strategies and operations for battle, resulting in frequent and non-repetitive human-computer interaction so as to improve the human-computer interaction efficiency.

Figure 15:
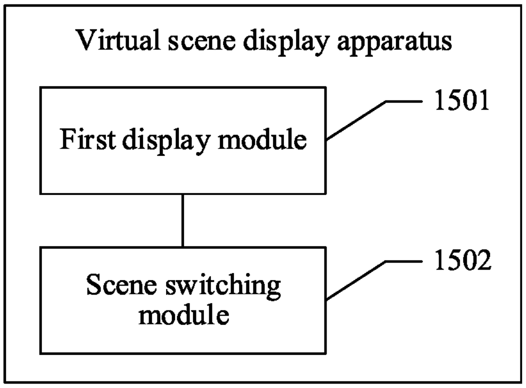
FIG. 15 is a block diagram of a virtual scene display apparatus according to an embodiment of this application.

FIG. 15 is a block diagram of a virtual scene display apparatus according to an embodiment of this application. The apparatus is configured to perform the steps of the foregoing virtual scene display method. Referring to FIG. 15, the apparatus includes: a first display module 1501 and a scene switching module 1502.

The first display module 1501 is configured to display a plurality of virtual objects for the $i^{th}$ round of battle in a first virtual scene generated by a first account, the plurality of virtual objects being controlled by different accounts participating in battle respectively, where i is a positive integer; and the scene switching module 1502 is configured to switch the first virtual scene to a second virtual scene generated by a second account when the $i^{th}$ round of battle ends.

The first display module 1501 is further configured to display the plurality of virtual objects for the $(i+1)^{th}$ round of battle in the second virtual scene.

In some embodiments, the first virtual scene is edited by the first account based on an initial virtual scene and a plurality of scene elements.

Figure 16:
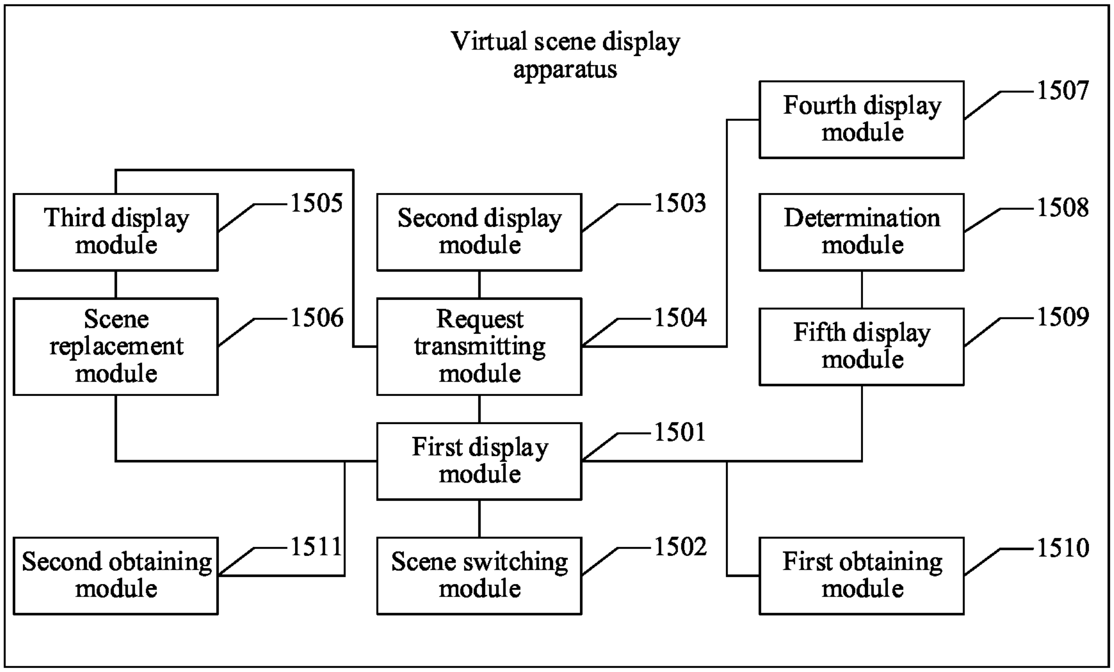
FIG. 16 is a block diagram of another virtual scene display apparatus according to an embodiment of this application.

In some embodiments, FIG. 16 is a block diagram of another virtual scene display apparatus according to an embodiment of this application. Referring to FIG. 16, the apparatus further includes: a second display module 1503, configured to display an initial virtual scene and a scene element column in response to a scene editing operation, the scene element column displaying a plurality of scene elements to be added; the second display module 1503 is further configured to display the scene element in the initial virtual scene in response to an operation for adding any scene element; and a request transmitting module 1504, configured to transmit a scene generation request to a server in response to a scene generation operation, the scene generation request being used for instructing the server to generate a third virtual scene, and the third virtual scene including the initial virtual scene and at least one scene element added to the initial virtual scene.

In some embodiments, the initial virtual scene displays a controlled virtual object, and the controlled virtual object is controlled by a third account currently logged in by the terminal. The second display module 1503 is configured to display the controlled virtual object moving to a target position indicated by the adding operation in response to an operation for adding any scene element; and display the controlled virtual object placing the scene element at the target position.

In some embodiments, the request transmitting module 1504 is configured to display a scene naming interface in response to the scene generation operation, the scene naming interface being configured to set a scene name of the third virtual scene; transmit a name verification request to the server, the name verification request being used for instructing the server to verify the scene name inputted based on the scene naming interface; and transmit the scene generation request to the server when the server verification passes.

In some embodiments, the first display module 1501 is further configured to display at least one control in response to an editing end operation, the at least one control being configured to control the controlled virtual object, and the controlled virtual object being controlled by the third account currently logged in by the terminal; and display the controlled virtual object moving in the third virtual scene in response to a control operation for the controlled virtual object.

In some embodiments, referring to FIG. 16, the apparatus further includes: a third display module 1505, configured to display first prompt information returned by the server, the first prompt information being used for prompting that the quantity of virtual scenes saved by the third account currently logged in by the terminal exceeds the target quantity; the third display module 1505 is further configured to display a scene display interface in response to a confirmation operation for the first prompt information, the scene display interface being configured to display the virtual scenes saved by the third account; and a scene replacement module 1506, configured to replace the selected virtual scene with the third virtual scene based on a selection operation in the scene display interface.

In some embodiments, referring to FIG. 16, the apparatus further includes: a fourth display module 1507, configured to display second prompt information returned by the server, the second prompt information being used for prompting that the third virtual scene is not a default virtual scene of the third account currently logged in by the terminal.

In some embodiments, referring to FIG. 16, the apparatus further includes: a determination module 1508, configured to determine a default virtual scene saved by the third account currently logged in by the terminal in response to a matching participation operation; and a fifth display module 1509, configured to display third prompt information when the default virtual scene is not saved in the third account, the third prompt information being used for prompting that the default virtual scene which is not saved cannot participate in matching.

In some embodiments, referring to FIG. 16, the first account and the second account participate in N rounds of battle, where N is a positive integer greater than 1, and i is less than N. The first display module 1501 is configured to display the plurality of virtual objects for the Nth round of battle in the first virtual scene or the second virtual scene when the $(N-1)^{th}$ round of battle ends and the first account and the second account are tied.

In some embodiments, referring to FIG. 16, the first account belongs to a first team, the second account belongs to a second team, the first team and the second team participate in N rounds of battle, and each team includes at least one account, where N is a positive integer greater than 1, and i is less than N. The apparatus further includes: a first obtaining module 1510, configured to obtain a fourth virtual scene generated by a fourth account when the $(N-1)^{th}$ round of battle ends and the first team and the second team are tied, the fourth account belonging to the same team as the first account or the second account. The first display module 1501 is further configured to display the plurality of virtual objects for the Nth round of battle in the fourth virtual scene.

In some embodiments, referring to FIG. 16, the first account belongs to a first team, the second account belongs to a second team, the first team and the second team participate in N rounds of battle, and each team includes at least one account, where N is a positive integer greater than 1, and i is less than N. The apparatus further includes: a second obtaining module 1511, configured to obtain a fifth virtual scene generated by a fifth account when the $(N-1)^{th}$ round of battle ends and the first team and the second team are tied, the fifth account not participating in this matching, and the fifth virtual scene being randomly determined by a server. The first display module 1501 is further configured to display the plurality of virtual objects for the Nth round of battle in the fifth virtual scene.

According to the technical solutions provided in the embodiments of this application, by alternately displaying the first virtual scene generated by the first account and the second virtual scene generated by the second account during multiple rounds of battle between the virtual object controlled by the first account and the virtual object controlled by the second account, the virtual scenes of the first account and the second account will change during battle. Both parties in battle do not understand the virtual scene generated by the other party, so it is necessary to flexibly use battle strategies and operations for battle, resulting in frequent and non-repetitive human-computer interaction so as to improve the human-computer interaction efficiency.

The division of the foregoing functional modules is only described for exemplary purposes when the virtual scene display apparatus provided in the foregoing embodiment displays a virtual scene. In practical applications, the foregoing function allocation may be completed by different functional modules according to needs, that is, the internal structure of the apparatus is divided into different functional modules to complete all or part of the functions described above. In addition, the virtual scene display apparatus and the virtual scene display method provided in the foregoing embodiments fall within a same conception. For details of a specific implementation process, refer to the method embodiments. Details are not described herein again.

In the embodiments of this application, the computer device may be configured as a terminal or a server. When the computer device is configured as a terminal, the technical solutions provided in the embodiments of this application are implemented by the terminal as an executive body; when the computer device is configured as a server, the technical solutions provided in the embodiments of this application are implemented by the server as an executive body; or the technical solutions provided in this application are implemented through the interaction between the terminal and the server. The implementation is not limited in the embodiments of this application.

Figure 17:
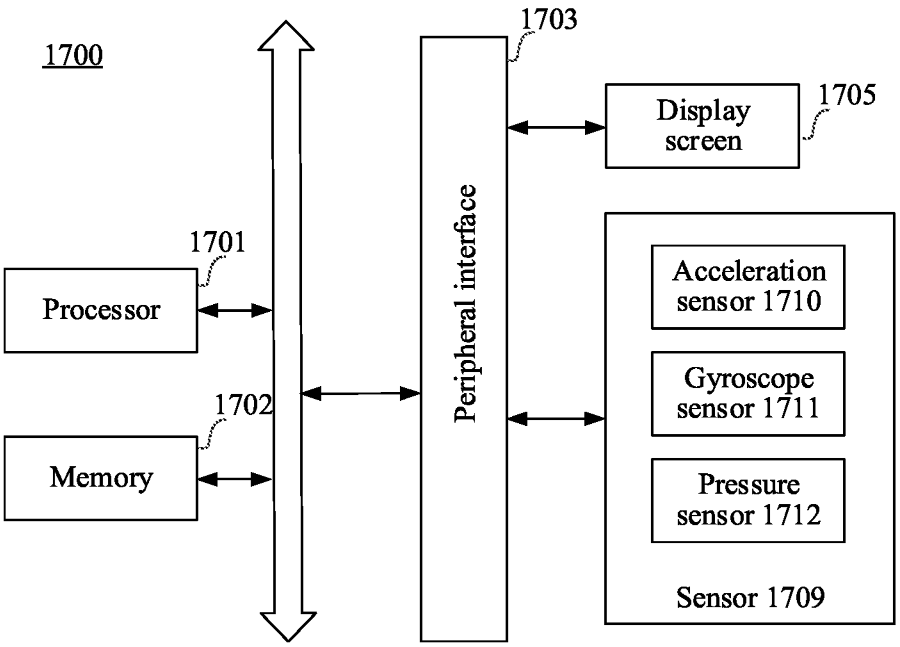
FIG. 17 is a structural block diagram of a terminal according to an embodiment of this application.

FIG. 17 is a structural block diagram of a terminal according to an embodiment of this application. The terminal 1700 is a portable mobile terminal, such as: a smart phone, a tablet computer, a moving picture experts group audio layer III (MP3) player, a moving picture experts group audio layer IV (MP4) player, a notebook computer, or a desktop computer. The terminal 1700 may also be referred to as another name such as user equipment, a portable terminal, a laptop terminal, or a desktop terminal.

Generally, the terminal 1700 includes: a processor 1701 and a memory 1702.

The processor 1701 includes one or more processing cores, for example, a 4-core processor or an 8-core processor. The processor 1701 may be implemented in at least one hardware form of digital signal processing (DSP), a field-programmable gate array (FPGA), and a programmable logic array (PLA). In some embodiments, the processor 1701 includes a main processor and a coprocessor. The main processor is a processor configured to process the data in an awake state, and is also referred to as a central processing unit (CPU). The coprocessor is a low power consumption processor configured to process the data in a standby state. In some embodiments, the processor 1701 is integrated with a graphics processing unit (GPU). The GPU is configured to render and draw the content that needs to be displayed on a display screen.

The memory 1702 includes one or more non-transitory computer-readable storage media. The computer-readable storage medium is non-transient. The memory 1702 further includes a high-speed random access memory and a non-volatile memory, for example, one or more disk storage devices or flash storage devices. In some embodiments, the non-transitory computer-readable storage medium in the memory 1702 is configured to store at least one computer program, and the at least one computer program is executed by the processor 1701 to implement the virtual scene display method provided in the method embodiments of this application.

In some embodiments, the terminal 1700 further includes: a peripheral interface 1703 and at least one peripheral device. The processor 1701, the memory 1702 and the peripheral interface 1703 are connected through a bus or a signal wire. Each peripheral device is connected to the peripheral interface 1703 through a bus, a signal wire or a circuit board. Specifically, the peripheral device includes: a display screen 1705.

The peripheral interface 1703 is configured to connect at least one peripheral device related to input/output (I/O) to the processor 1701 and the memory 1702. In some embodiments, the processor 1701, the memory 1702 and the peripheral interface 1703 are integrated on a same chip or circuit board. In some other embodiments, any one or two of the processor 1701, the memory 1702 and the peripheral interface 1703 may be implemented on a single chip or circuit board. This is not limited in this embodiment.

The display screen 1705 is configured to display a user interface (UI). The UI includes a graph, text, an icon, a video, and any combination thereof. When the display screen 1705 is a touch display screen, the display screen 1705 further has a capability of acquiring a touch signal on or above a surface of the display screen 1705. The touch signal is inputted to the processor 1701 as a control signal for processing. In this case, the display screen 1705 is further configured to provide a virtual button and/or a virtual keyboard that are/is also referred to as a soft button and/or a soft keyboard. In some embodiments, one display screen 1705 is provided and arranged on a front panel of the terminal 1700. In some other embodiments, at least two display screens 1705 are provided and respectively arranged on different surfaces of the terminal 1700 or designed in a folded mode. In some other embodiments, the display screen 1705 is a flexible display screen arranged on a curved surface or a folded surface of the terminal 1700. Even, the display screen 1705 may be further set in a non-rectangular irregular pattern, namely, a special-shaped screen. The display screen 1705 is prepared from materials such as a liquid crystal display (LCD), an organic light-emitting diode (OLED), or the like.

In some embodiments, the terminal 1700 further includes one or more sensors 1709. The one or more sensors 1709 include but are not limited to: an acceleration sensor 1710, a gyroscope sensor 1711 and a pressure sensor 1712.

The acceleration sensor 1710 may detect a magnitude of acceleration on three coordinate axes of a coordinate system established with the terminal 1700. For example, the acceleration sensor 1710 is configured to detect components of gravity acceleration on the three coordinate axes. The processor 1701 controls the display screen 1705 to display the UI in a horizontal view or a longitudinal view according to a gravity acceleration signal acquired by the acceleration sensor 1710. The acceleration sensor 1710 is further configured to acquire motion data of a game or a user.

The gyroscope sensor 1711 detects a body direction and a rotation angle of the terminal 1700. The gyroscope sensor 1711 cooperates with the acceleration sensor 1710 to acquire 3D actions of the user on the terminal 1700. The processor 1701 implements the following functions according to the data acquired by the gyroscope sensor 1711: action sensing (such as changing the UI according to a tilt operation of the user), image stabilization during shooting, game control, and inertial navigation.

The pressure sensor 1712 is arranged at a side frame of the terminal 1700 and/or a lower layer of the display screen 1705. When the pressure sensor 1712 is arranged at the side frame of the terminal 1700, a holding signal of the user on the terminal 1700 is detected. The processor 1701 performs left and right hand recognition or a quick operation according to the holding signal acquired by the pressure sensor 1712. When the pressure sensor 1712 is arranged at the lower layer of the display screen 1705, the processor 1701 controls an operable control on the UI according to a pressure operation of the user on the display screen 1705. The operable control includes at least one of a button control, a scroll-bar control, an icon control, and a menu control.

A person skilled in the art may understand that the structure shown in FIG. 17 constitutes no limitation on the terminal 1700, and the terminal may include more or fewer components than those shown in the figure, or some components may be combined, or different component layouts may be used.

An embodiment of this application further provides a non-transitory computer-readable storage medium. The computer-readable storage medium stores at least one segment of computer program. The at least one segment of computer program is loaded and executed by the processor of the terminal to implement the operations performed by the terminal in the virtual scene display method according to the foregoing embodiments. For example, the computer-readable storage medium may be a read-only memory (ROM), a random access memory (RAM), a compact disc read-only memory (CD-ROM), a magnetic tape, a floppy disk, an optical data storage device, or the like.

An embodiment of this application further provides a computer program product. The computer program product includes computer program codes, and the computer program codes are stored in a non-transitory computer-readable storage medium. The processor of the terminal reads the computer program codes from the computer-readable storage medium, and the processor executes the computer program codes, so that the terminal performs the virtual scene display methods provided in various optional implementations mentioned above.

A person of ordinary skill in the art may understand that all or some of the steps in the foregoing embodiments may be implemented by hardware, or may be implemented by a program instructing relevant hardware. The program is stored in a non-transitory computer-readable storage medium. The foregoing storage medium may be a ROM, a magnetic disk, an optical disc, or the like.

In this application, the term "unit" or "module" in this application refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. The foregoing descriptions are merely optional embodiments of this application, but are not intended to limit this application. Any modification, equivalent replacement, or improvement made within the spirit and principle of this application shall fall within the protection scope of this application.

What is claimed is:

1. A method for generating a virtual scene performed by a terminal, comprising:

displaying a virtual scene generation interface on a screen of the terminal, the virtual scene generation interface including an initial virtual scene and a scene element column, and the initial virtual scene further including a first virtual object controlled by a first account of a user of the terminal and the scene element column displaying a plurality of scene elements to be added to the initial virtual scene;

in response to a click and drag operation of a first scene element in the scene element column on the screen by the user of the terminal, dragging the first scene element from the scene element column and placing the first scene element at a target position in the initial virtual scene and automatically moving the first virtual object from its current position to the target position:

in response to a scene generation operation by the user of the terminal, transmitting a scene generation request to a server, the scene generation request instructing the server to generate a first virtual scene according to the initial virtual scene and the first scene element and the first virtual object at the target position in the initial virtual scene;

in response to a confirmation of the generation of the first virtual scene by the server, replacing the virtual scene generation interface with a matching interface for a battle on the screen of the terminal, the matching interface including a matching start control;

in response to a user operation on the matching start control by the user of the terminal, selecting, among a plurality of accounts, a second account matching the first account and starting a first round of the battle between the first account and the second account in the first virtual scene;

displaying a plurality of virtual objects for the $i^{th}$ round of battle in the first virtual scene generated by the first account, the plurality of virtual objects being controlled by different accounts participating in the battle respectively, i being a positive integer;

switching the first virtual scene to a second virtual scene generated by the second account when the $i^{th}$ round of battle ends; and displaying the plurality of virtual objects for the $(i+1)^{th}$ round of battle in the second virtual scene.

2. The method according to claim 1, wherein the first virtual scene is edited by the first account based on an initial virtual scene and a plurality of scene elements.

3. The method according to claim 1, wherein the first virtual scene is generated by:

displaying an initial virtual scene and a scene element column, the scene element column displaying a plurality of scene elements to be added;

displaying a scene element in the initial virtual scene in response to an operation for adding the scene element; and transmitting a scene generation request to a server in response to a scene generation operation, the scene generation request instructing the server to generate the first virtual scene, and the first virtual scene comprising the initial virtual scene and at least one scene element added to the initial virtual scene.

4. The method according to claim 1, further comprising:

before the scene generation operation by the user of the terminal, displaying at least one control in the initial virtual scene in response to an editing end operation by the user of the terminal, the at least one control being configured to control a virtual object in response to a control operation by the first account currently logged in by the user of the terminal.

5. The method according to claim 1, further comprising:

displaying prompt information when the default virtual scene is not saved in the first account currently logged in by the terminal in response to a matching participation operation.

6. The method according to claim 1, wherein the first account and the second account participate in N rounds of battle, wherein N is a positive integer greater than 1, and i is less than N; and the method further comprises:

displaying the plurality of virtual objects for the $N^{th}$ round of battle in the first virtual scene or the second virtual scene when the $(N-1)^{th}$ round of battle ends and the first account and the second account are tied.

7. The method according to claim 1, wherein the first account belongs to a first team, the second account belongs to a second team, the first team and the second team participate in N rounds of battle, and each team comprises at least one account, wherein N is a positive integer greater than 1, and i is less than N; and the method further comprises:

displaying the plurality of virtual objects for the $N^{th}$ round of battle in a fourth virtual scene generated by a fourth account when the $(N-1)^{th}$ round of battle ends and the first team and the second team are tied, the fourth account belonging to the same team as the first account or the second account or randomly determined by the server.

8. A terminal, comprising a processor and a memory, the memory storing at least one segment of computer program, and the at least one segment of computer program being loaded by the processor and causing the terminal to perform a method for generating a virtual scene including:

displaying a virtual scene generation interface on a screen of the terminal, the virtual scene generation interface including an initial virtual scene and a scene element column, and the initial virtual scene further including a first virtual object controlled by a first account of a user of the terminal and the scene element column displaying a plurality of scene elements to be added to the initial virtual scene;

in response to a click and drag operation of a first scene element in the scene element column on the screen by the user of the terminal, dragging the first scene element from the scene element column and placing the first scene element at a target position in the initial virtual scene and automatically moving the first virtual object from its current position to the target position;

in response to a scene generation operation by the user of the terminal, transmitting a scene generation request to a server, the scene generation request instructing the server to generate a first virtual scene according to the initial virtual scene and the first scene element and the first virtual object at the target position in the initial virtual scene;

in response to a confirmation of the generation of the first virtual scene by the server, replacing the virtual scene generation interface with a matching interface for a battle on the screen of the terminal, the matching interface including a matching start control;

in response to a user operation on the matching start control by the user of the terminal, selecting, among a plurality of accounts, a second account matching the first account and starting a first round of the battle between the first account and the second account in the first virtual scene;

displaying a plurality of virtual objects for the $i^{th}$ round of battle in the first virtual scene generated by the first account, the plurality of virtual objects being controlled by different accounts participating in the battle respectively, i being a positive integer;

switching the first virtual scene to a second virtual scene generated by the second account when the $i^{th}$ round of battle ends; and displaying the plurality of virtual objects for the $(i+1)^{th}$ round of battle in the second virtual scene.

9. The terminal according to claim 8, wherein the first virtual scene is edited by the first account based on an initial virtual scene and a plurality of scene elements.

10. The terminal according to claim 8, wherein the first virtual scene is generated by:

displaying an initial virtual scene and a scene element column, the scene element column displaying a plurality of scene elements to be added;

displaying a scene element in the initial virtual scene in response to an operation for adding the scene element; and transmitting a scene generation request to a server in response to a scene generation operation, the scene generation request instructing the server to generate the first virtual scene, and the first virtual scene comprising the initial virtual scene and at least one scene element added to the initial virtual scene.

11. The terminal according to claim 10, wherein the method further comprises:

displaying prompt information when the default virtual scene is not saved in the first account currently logged in by the terminal in response to a matching participation operation.

12. The terminal according to claim 8, wherein the method further comprises:

before the scene generation operation by the user of the terminal, displaying at least one control in the initial virtual scene in response to an editing end operation by the user of the terminal, the at least one control being configured to control a virtual object in response to a control operation by the first account currently logged in by the user of the terminal.

13. The terminal according to claim 8, wherein the first account and the second account participate in N rounds of battle, wherein N is a positive integer greater than 1, and i is less than N; and the method further comprises:

displaying the plurality of virtual objects for the $N^{th}$ round of battle in the first virtual scene or the second virtual scene when the $(N-1)^{th}$ round of battle ends and the first account and the second account are tied.

14. The terminal according to claim 8, wherein the first account belongs to a first team, the second account belongs to a second team, the first team and the second team participate in N rounds of battle, and each team comprises at least one account, wherein N is a positive integer greater than 1, and i is less than N; and the method further comprises:

displaying the plurality of virtual objects for the $N^{th}$ round of battle in a fourth virtual scene generated by a fourth account when the $(N-1)^{th}$ round of battle ends and the first team and the second team are tied, the fourth account belonging to the same team as the first account or the second account or randomly determined by the server.

15. A non-transitory computer-readable storage medium, storing at least one segment of computer program, and the at least one segment of computer program being loaded by a processor of a terminal and causing the terminal to perform a method for generating a virtual scene including:

displaying a virtual scene generation interface on a screen of the terminal, the virtual scene generation interface including an initial virtual scene and a scene element column, and the initial virtual scene further including a first virtual object controlled by a first account of a user of the terminal and the scene element column displaying a plurality of scene elements to be added to the initial virtual scene;

in response to a click and drag operation of a first scene element in the scene element column on the screen by the user of the terminal, dragging the first scene element from the scene element column and placing the first scene element at a target position in the initial virtual scene and automatically moving the first virtual object from its current position to the target position;

in response to a scene generation operation by the user of the terminal, transmitting a scene generation request to a server, the scene generation request instructing the server to generate a first virtual scene according to the initial virtual scene and the first scene element and the first virtual object at the target position in the initial virtual scene;

in response to a confirmation of the generation of the first virtual scene by the server, replacing the virtual scene generation interface with a matching interface for a battle on the screen of the terminal, the matching interface including a matching start control;

in response to a user operation on the matching start control by the user of the terminal, selecting, among a plurality of accounts, a second account matching the first account and starting a first round of the battle between the first account and the second account in the first virtual scene;

displaying a plurality of virtual objects for the $i^{th}$ round of battle in the first virtual scene generated by the first account, the plurality of virtual objects being controlled by different accounts participating in the battle respectively, i being a positive integer;

switching the first virtual scene to a second virtual scene generated by the second account when the $i^{th}$ round of battle ends; and displaying the plurality of virtual objects for the $(i+1)^{th}$ round of battle in the second virtual scene.

16. The non-transitory computer-readable storage medium according to claim 15, wherein the first virtual scene is edited by the first account based on an initial virtual scene and a plurality of scene elements.

17. The non-transitory computer-readable storage medium according to claim 15, wherein the first virtual scene is generated by:

displaying an initial virtual scene and a scene element column, the scene element column displaying a plurality of scene elements to be added;

displaying a scene element in the initial virtual scene in response to an operation for adding the scene element; and transmitting a scene generation request to a server in response to a scene generation operation, the scene generation request instructing the server to generate the first virtual scene, and the first virtual scene comprising the initial virtual scene and at least one scene element added to the initial virtual scene.

18. The non-transitory computer-readable storage medium according to claim 17, wherein the method further comprises:

displaying prompt information when the default virtual scene is not saved in the first account currently logged in by the terminal in response to a matching participation operation.

19. The non-transitory computer-readable storage medium according to claim 15, wherein the method further comprises:

before the scene generation operation by the user of the terminal, displaying at least one control in the initial virtual scene in response to an editing end operation by the user of the terminal, the at least one control being configured to control a virtual object in response to a control operation by the first account currently logged in by the user of the terminal.

20. The non-transitory computer-readable storage medium according to claim 15, wherein the first account belongs to a first team, the second account belongs to a second team, the first team and the second team participate in N rounds of battle, and each team comprises at least one account, wherein N is a positive integer greater than 1, and i is less than N; and the method further comprises:

displaying the plurality of virtual objects for the $N^{th}$ round of battle in a fourth virtual scene generated by a fourth account when the $(N-1)^{th}$ round of battle ends and the first team and the second team are tied, the fourth account belonging to the same team as the first account or the second account or randomly determined by the server.

* * * * *